Aug. 6, 1968 G. M. BROWN 3,395,947

SLIDEWAY SYSTEM

Filed May 28, 1965 3 Sheets-Sheet 1

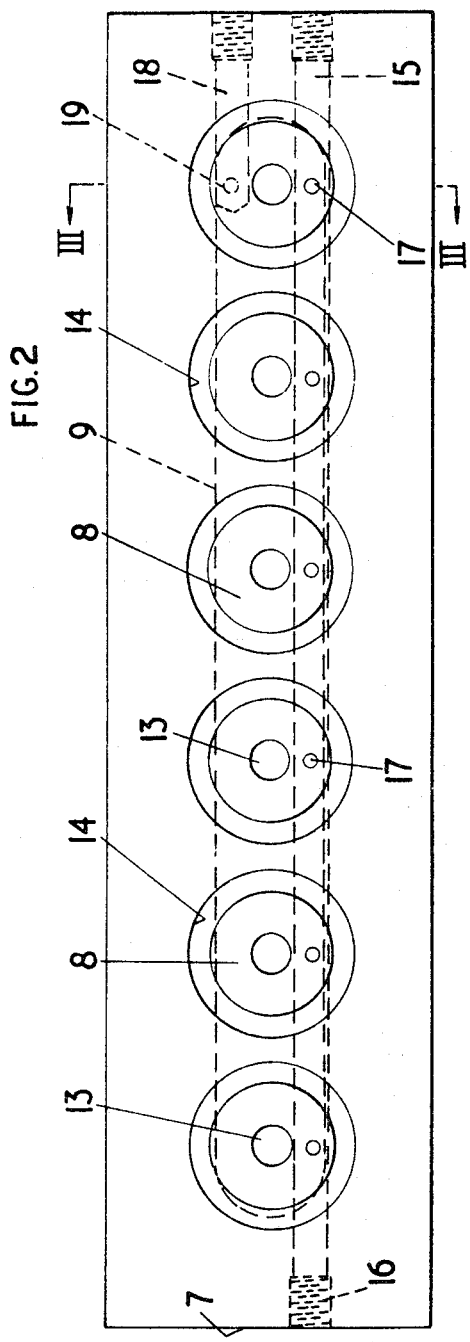

United States Patent Office 3,395,947
Patented Aug. 6, 1968

3,395,947
SLIDEWAY SYSTEM
Graham Maurice Brown, Daventry, England, assignor to Charles Churchill and Company, Limited, Birmingham, England, a British company
Filed May 28, 1965, Ser. No. 459,764
Claims priority, application Great Britain, June 3, 1964, 22,945/64
10 Claims. (Cl. 308—5)

ABSTRACT OF THE DISCLOSURE

A pressure lubricated slideway system having one side of a floating, parallel-sided compensating member forming one of the bearing faces, and pressurized fluid being supplied to the other side of the compensating member to bias it.

---

This invention relates to a pressurised-fluid slideway system for a sliding member, for example, the sliding carriage of a machine tool on a guideway, the system comprising a male guide member having oppositely facing bearing faces guided between cooperating oppositely facing bearing faces on a female guide member and means for supplying pressure fluid to the gap between the respective cooperating bearing faces. It is known for the bearing faces to be lubricated by hydrostatic, i.e., externally pressurised, means as opposed to the more customary boundary-cum-hydrodynamic means, and such a slideway system is described in British Patent Specification No. 876,171. In such a hydrostatically lubricated system, the small clearance between the bearing faces on the male and female guide members is occupied by a film of pressurised fluid, such as oil.

In simple hydrostatically lubricated systems in which the oil is fed to bearing pockets on the bearing faces from a constant pressure source via a fixed hydraulic restrictor which may possess either laminar or turbulent flow characteristics, the rate at which the oil film thickness varies with externally applied load on the bearing is dependent on the nominal oil film thickness. It is desirable to maintain the nominal oil film thickness at its minimum value.

In practice this minimum value is governed by the degree of parallelism which can be maintained along the length of the male guide member. Further, in systems utilising high oil pressures, the nominal oil film thickness is affected by elastically induced distortions occurring principally in the female guide member.

It is an object of this invention to provide an improved slideway system which can be arranged to accommodate both positive and negative going loads and in which the effects of variations in thickness of the male guide member and of elastically induced distortions in the female guide member may be reduced.

This invention consists in a pressure-fluid slideway system for a slidable member, the system comprising a male guide member having oppositely facing bearing faces guided between cooperating oppositely facing bearing faces on a female guide member, and means for supplying pressure fluid to the gaps between the respective cooperating pairs of bearing faces, one of the bearing faces being formed by one side of a parallel-sided keep member arranged to bear on a surface provided on the remainder of the respective guide member by way of a layer of pressurised fluid.

The system may be horizontal or vertical.

The system is preferably arranged such that the normal clearance between the keep member and the remainder of the respective guide member is substantially greater than the normal clearance between the pair of bearing faces formed by the keep member and the other guide member.

Using this invention, it is possible to design a hydrostatically lubricated slideway system which will accommodate both positive and negative going loads in which the effects of variations in thickness of the male guide member and the effects of elastically induced distortions in the female guide member may be appreciably reduced.

The keep member hydrostatic thrust on said other guide member can thus be in the form of a preload force whose magnitude is independent of the externally applied load, and the effective "stiffness" of the slideway system may be due entirely to that of the main bearing surfaces if the keep member is arranged such that it is only subjected to negative-going externally applied loads, i.e., those acting in the opposite direction to the main load the slideway system is designed to bear; however, the value of the preload force must then be chosen so as to always exceed the value of the negative-going externally applied load, for if the negative-going externally applied load were to exceed the pre-load force, the keep member would collapse onto the remainder of the respective guide member and the slideway system would exhibit gross non-linearity. This is also true if the keep member is arranged such that it may be subjected to positive-going externally applied loads; such loads must not exceed the pre-load force.

The keep member preferably forms part of the female guide member, and, though not essential, the male guide member is preferably fixed, e.g., to a factory floor or machine tool bed, with the female guide member horizontally movable. However, in another arrangement, the keep member may form part of the male guide member, for instance when the female guide member is fixed and the male guide member movable.

It is usually found desirable to confine said layer of pressure fluid so as to prevent leakage or excessive leakage, using a resilient member sealing against the keep member and the remainder of the respective guide member around the periphery of the confined layer of pressure fluid. The resilient member may be formed of artificial or natural rubber. The resilient member is preferably an O-ring, and an annular groove may be formed on the side of the keep member or on the remainder of the respective guide member, or on both, to locate the O-ring. It will usually be found desirable to use a number of O-rings in order to preload the keep member effectively.

The system may incorporate substantially constant pressure, pressure fluid supply means connected by ducts incorporating restrictors to the gaps between respective cooperating pairs of bearing faces and connected by a duct or ducts with no restrictors to the gap between the keep member and the surface on the remainder of the respective guide member.

This invention extends to a machine tool having the slideway system according to the invention, and also to a method of using the slideway system, comprising supplying fluid pressure to the gaps between the respective cooperating pairs of bearing faces, supplying constant pressure, fluid pressure to the gap between the keep member and the surface on the remainder of the respective guide member, and sliding the slidable member with the slidable member guided by the slideway system.

The invention will be further described, by way of example, with reference to the accompanying drawings, of which:

FIGURE 2 is a bottom view of the keep-plate indicated in FIGURE 1;

Figure 1:
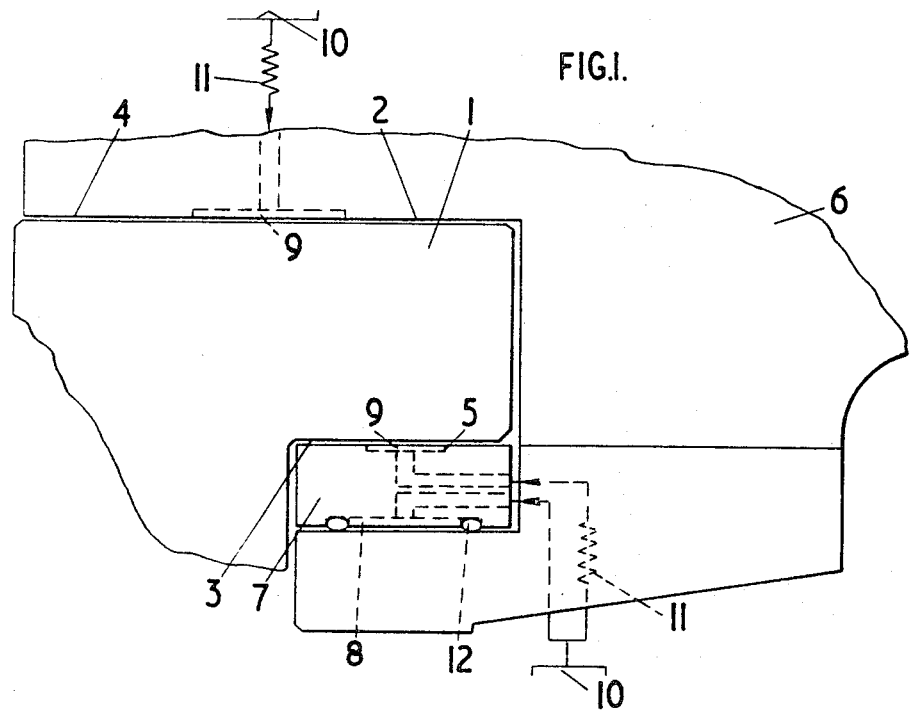
FIGURE 1 is a schematic end view showing the general layout of an embodiment of the slideway system of this invention.

With reference to FIGURE 1, a male guide member 1 has oppositely facing bearing faces 2 and 3 guided between cooperating oppositely facing bearing faces 4 and 5 on a female guide member 6. Part of the female member 6 is formed by a floating parallel-sided keep-plate 7 which is virtually mechanically unrestrained in a direction normal to the bearing faces 2–5 but is maintained in a state of equilibrium in this direction by virtue of a pad 8 of pressure fluid and the hydrostatic bearing thrust between the bearing faces 3 and 5.

Bearing pockets 9 are formed in the female member 6 and the keep-plate 7, and these bearing pockets 9 are supplied with hydraulic fluid from a constant pressure source 10 by way of fixed hydraulic restrictors 11. The pad of hydraulic fluid 8 is confined by an O-ring 12, and is pressurised directly from the constant pressure source 10.

In this manner, variations in thickness of the male guide member 1 can be accommodated by the pad(s) 8 as can be any elastically induced distortions of the female guide member 6. The hydrostatic bearing can be arranged so as to maintain an oil film of constant and uniform thickness between the surfaces 3 and 5.

Figure 3:
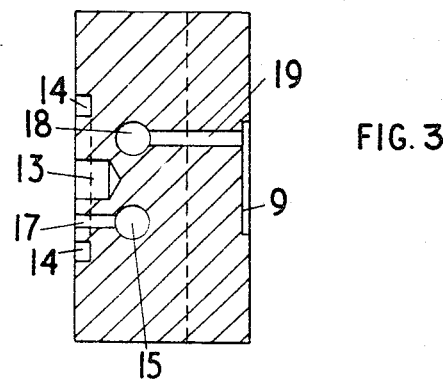
FIGURE 3 is a cross-section along the line III—III of FIGURE 2.

FIGURES 2 and 3 give a more accurate representation of the keep-plate 7. As shown in FIGURE 2, the keep-plate 7 is of extended length, and a number of pads 8 are provided along its length. The holes 13 are merely pilot holes, but annular grooves 14 are provided to locate the O-rings 12. A longitudinal bore 15 is provided running the length of the keep-plate 7, and plugged at 16, for supplying hydraulic fluid to the pads 8 by way of intercommunicating ducts 17.

On the other side of the keep-plate 7, the bearing pocket 9 is of elongated shape, and is supplied with hydraulic fluid by way of a bore 18 and an inter-communicating duct 19. Though not preferred in the embodiment illustrated, the keep plate 7 may be formed in two parts, divided along the dotted line shown in FIGURE 3, for convenience in production.

Figure 4:
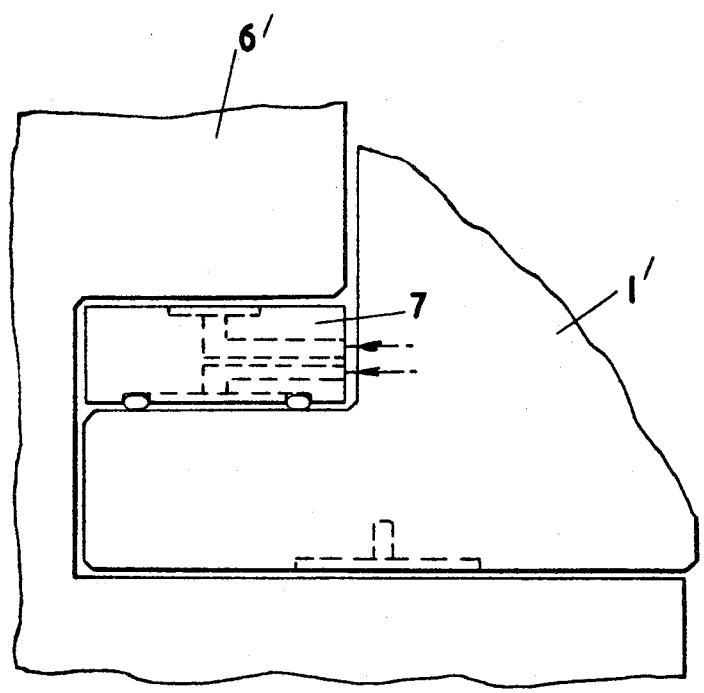
FIGURE 4 is a schematic end view showing another embodiment of the invention.

In the embodiment illustrated in FIGURES 1–3, the male guide member 1 is one of a pair of fixed male guide members, and the female guide member 6 is fixed to and carries a heavy, horizontally-movable part of a machine tool. However, it is apparent that the keep plate 7 could form part of a movable male guide member fixed to and carrying the heavy, horizontally-movable part of a machine tool with the female guide member fixed. Such an arrangement is illustrated in FIGURE 4, where the keep plate is referenced as 7, and the male and female guide members as 1' and 6' respectively.

I claim:

1. A pressure-fluid slideway system for a slidable member, the system comprising male guide means having bearing faces facing in a direction at substantially 180° to each other and guided between cooperating bearing faces which also face in directions substantially 180° to each other on female guide means, and means supplying pressurised fluid to gaps between the respective cooperating pairs of bearing faces, the improvement being that a bearing face of one of said pairs of bearing faces consists of one side of a parallel-sided floating compensating member forming part of that respective guide means, said compensating member being constrained to remain substantially fixed relative to said respective guide means in the axial direction of the system but mechanically unrestrained and movable relative to said respective guide means in either direction normal to said axial direction, and a gap containing pressurized fluid between the opposite side of said compensating member and the remainder of said respective guide means.

2. A system as claimed in claim 1 wherein the gap between said opposite side of said compensating member and the remainder of said respective guide means is substantially greater than the gap between said one side of said compensating member and the bearing face of said one pair of bearing faces.

3. A system as claimed in claim 1 wherein said compensating member is only subject to negative-going externally applied loads on said slideway system.

4. A system as claimed in claim 1 wherein said compensating member comprises a part of said female guide means.

5. A system as claimed in claim 1 wherein said compensating member comprises a part of said male guide means.

6. A system as claimed in claim 1 wherein resilient sealing means positioned between said opposite side of said compensating member and the remainder of said respective guide means contains said pressurized fluid in the gap.

7. A system as claimed in claim 1 wherein said pressurized fluid is supplied at substantially constant pressure, ducts connect said pressurized fluid supply means to said gaps between said cooperating pairs of said bearing faces, fluid restrictors in said ducts, and at least one duct having no restrictor connecting said pressurized fluid supply means to the gap between said opposite side of said compensating member and the remainder of said respective guide means.

8. A pressure-fluid slideway system as claimed in claim 6, wherein said resilient sealing means is formed of rubber.

9. A pressure-fluid slideway system as claimed in claim 6, wherein said resilient sealing means comprises at least one O-ring.

10. A pressure-fluid slideway system as claimed in claim 6, wherein said resilient sealing means comprises at least one O-ring located in an annular groove.

References Cited

UNITED STATES PATENTS

| 466,645 | 1/1892 | Wood | 308—9 |
| 2,869,933 | 1/1959 | Bissinger. | |
| 2,951,729 | 9/1960 | Skarstrom | 308—9 |
| 3,053,583 | 9/1960 | Shaw | 308—9 |
| 3,119,639 | 1/1964 | Adams | 308—9 |
| 3,137,530 | 6/1964 | Kohler | 308—5 |

FOREIGN PATENTS

| 802,155 | 10/1958 | Great Britain. |
| 876,171 | 8/1961 | Great Britain. |
| 202,298 | 6/1939 | Switzerland. |

MARTIN P. SCHWADRON, *Primary Examiner.*

L. L. JOHNSON, *Assistant Examiner.*